(12) United States Patent
Salter et al.

(10) Patent No.: US 10,343,488 B2
(45) Date of Patent: Jul. 9, 2019

(54) AUXILIARY UTILITY DUCT FOR A VEHICLE

(71) Applicant: FORD GLOBAL TECHNOLOGIES, LLC, Dearborn, MI (US)

(72) Inventors: Stuart C. Salter, White Lake, MI (US); Jim J. Surman, Clinton Township, MI (US); Cornel Lewis Gardner, Romulus, MI (US); Annette Lynn Huebner, White Lake, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 773 days.

(21) Appl. No.: 14/853,452

(22) Filed: Sep. 14, 2015

(65) Prior Publication Data

US 2017/0072772 A1    Mar. 16, 2017

(51) Int. Cl.
*B60H 1/00* (2006.01)
*B60H 1/24* (2006.01)

(52) U.S. Cl.
CPC ......... *B60H 1/246* (2013.01); *B60H 1/00564* (2013.01)

(58) Field of Classification Search
CPC .... B60H 1/00564; B60H 1/241; B60H 1/244; B60H 1/246
USPC ........................................ 454/144, 152, 159
See application file for complete search history.

(56) References Cited

U.S. PATENT DOCUMENTS

| 3,394,887 | A | * | 7/1968 | Megargle | B60H 1/00285 237/12.3 A |
|---|---|---|---|---|---|
| 3,550,522 | A | | 12/1970 | Edward et al. | |
| 4,343,230 | A | | 8/1982 | Lundstroem | |
| 4,840,115 | A | * | 6/1989 | Johnson | B60H 1/247 454/120 |
| 5,823,869 | A | | 10/1998 | Paturzo | |
| 6,079,781 | A | * | 6/2000 | Tilley | B60H 1/00285 297/180.1 |
| 6,393,724 | B1 | | 5/2002 | Apple et al. | |
| 6,843,717 | B1 | * | 1/2005 | Bennett | B60H 1/00564 128/200.27 |
| 6,857,955 | B1 | * | 2/2005 | Held | B60H 1/246 454/143 |
| 6,884,159 | B1 | * | 4/2005 | Ferraud, Jr. | B60H 1/00592 454/119 |

(Continued)

*Primary Examiner* — Gregory L Huson
*Assistant Examiner* — Dana K Tighe
(74) *Attorney, Agent, or Firm* — Vichit Chea; King & Schickli

(57) ABSTRACT

A vehicle having an air distribution system for moving air into a passenger compartment includes a front row of seats including a driver seat and a passenger seat, a second row of seats, and a console positioned therebetween. The console includes rearward facing vents and ducting directs air from the air distribution system through the vents and into the passenger compartment. An auxiliary duct has first and second telescoping portions. The first telescoping portion is pivotally attached to the console at a proximal end and in fluid communication with the ducting, and the second telescoping portion includes a vent positioned at a distal end. The auxiliary duct is positioned for pivotal movement within a plane defined by the console and a front row seat. A stop engages the auxiliary duct and limits a range of pivot between a stowed position and an active position.

7 Claims, 4 Drawing Sheets

(56) References Cited

U.S. PATENT DOCUMENTS

| | | | |
|---|---|---|---|
| 6,902,473 B1 * | 6/2005 | Goobeck | B60H 1/00564 454/127 |
| 6,993,930 B2 * | 2/2006 | Blackstone | A41D 13/0025 601/15 |
| 7,396,062 B2 * | 7/2008 | Hung | B60H 1/00564 296/24.34 |
| 7,555,807 B1 * | 7/2009 | Mastandrea | B60S 1/528 15/250.01 |
| 8,684,800 B2 | 4/2014 | Baldal | |
| 8,966,913 B2 | 3/2015 | Oh et al. | |
| 2005/0262719 A1 | 12/2005 | Calbreath | |
| 2006/0130997 A1 | 6/2006 | Marshall | |
| 2006/0258282 A1 | 11/2006 | Heck | |
| 2013/0318814 A1 | 12/2013 | Anikin | |

* cited by examiner

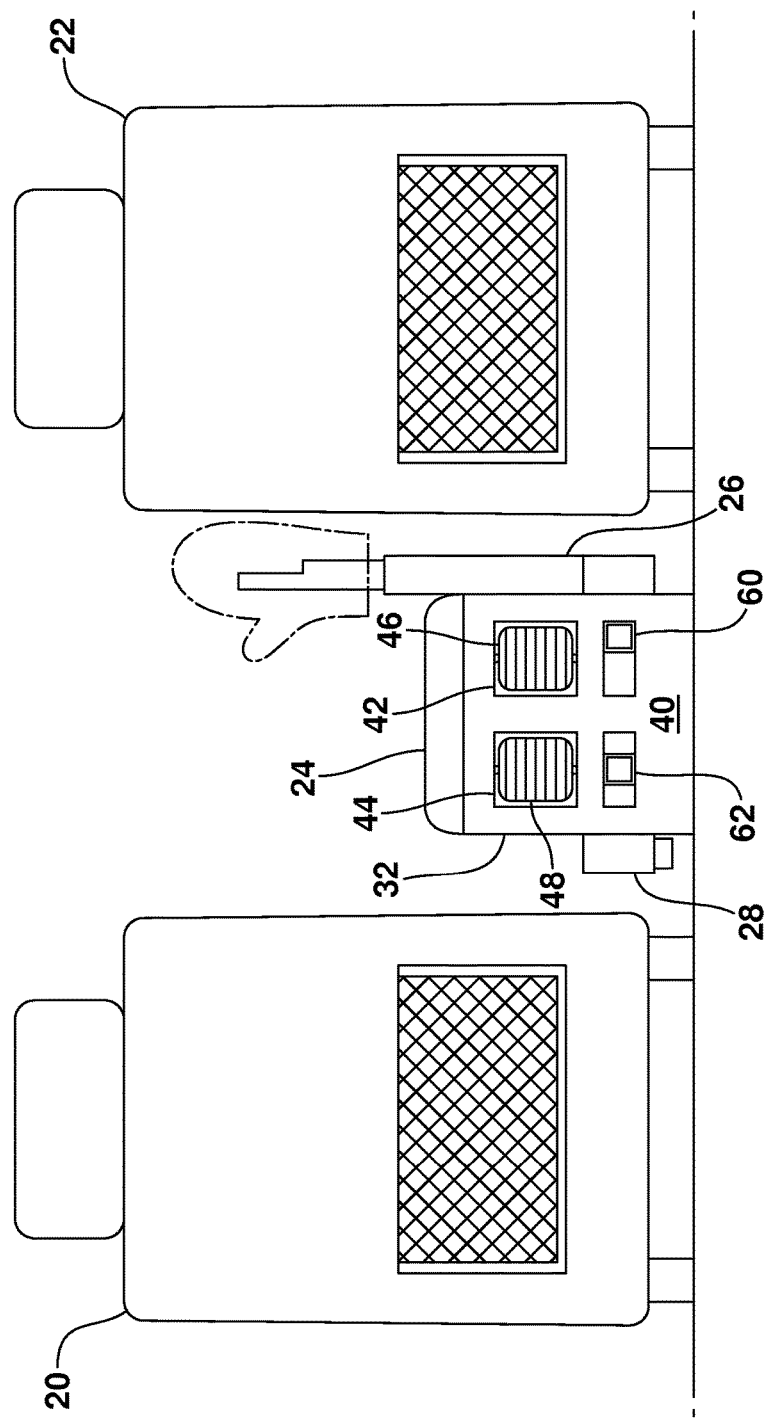

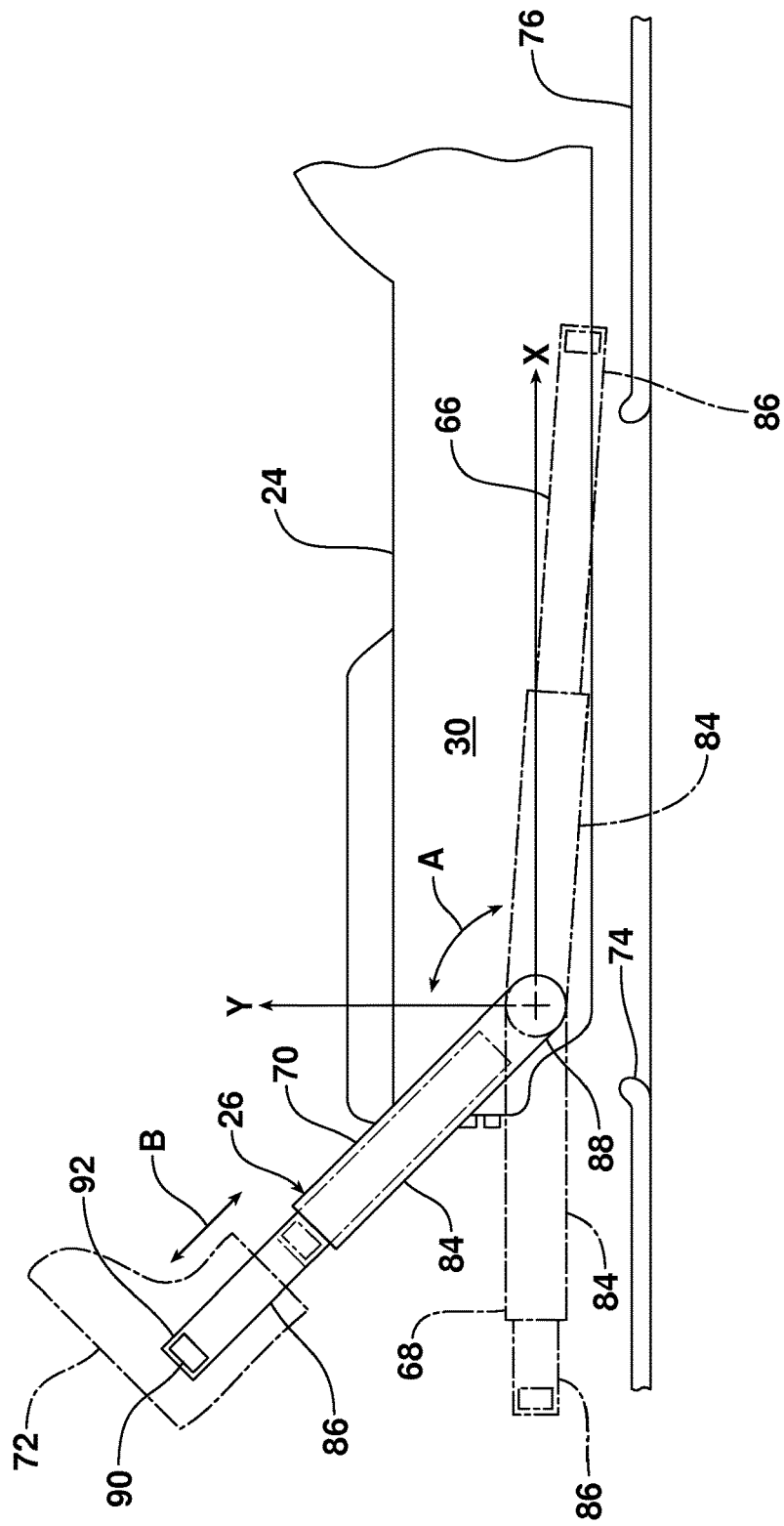

AUXILIARY UTILITY DUCT FOR A VEHICLE

TECHNICAL FIELD

This document relates generally to vehicle air ducts, and more specifically to an auxiliary utility duct.

BACKGROUND

Vehicles incorporate air distribution systems for moving air through heating and cooling systems in order to heat and/or cool a passenger compartment. The air is warmed or cooled and blown through vents into the passenger compartment. Traditionally, a limited number of vents were positioned within the instrument panel. The vents included louvres for directing air toward passengers and/or windows. Additional vents and louvres directed air onto a windshield primarily for defrosting the windshield and a floor area of the vehicle for warming passenger lower extremities.

In some vehicles including minivans, sport utility vehicles and crossover utility vehicles, for example, additional vents and louvres have been added and positioned within rear portions of the passenger compartment in order to ensure the comfort of second and third row passengers. In some instances, the temperature of the air flowing through the additional vents and louvres is individually controlled by the second or third row passengers.

Traditionally, all of the louvres are mounted flush within the vents and the vents formed within a surface of the vehicle whether in the instrument panel or along an upper panel adjacent a roof. During operation, some louvres remain flush with the surfaces of the vehicle while others, center console mounted louvres for example, partially extend from the vehicle surfaces when rotated from side to side to direct air in one direction or another. The louvres also typically pivot up and down further allowing air to be directed upwardly or downwardly. Positioning these vents and louvres in this manner has been sufficient to ensure their function of providing comfort to the passengers seated within the passenger compartment.

In addition to the comfort of the passengers, it is desirable to have additional vents that may be used to perform additional functions within the vehicle. Accordingly, a need exists for auxiliary ducting capable of performing such functions. A first function may include warming and/or drying an object such as a glove, hat, shoe, boot or the like. In support of this function, the auxiliary ducting could support the objects within an area between the first and second seat rows during use. A second function may include drying the floor areas behind or in front of the first row seats where melting snow or dripping water may pool on the floor. To accommodate these functions, the auxiliary ducting would preferably be extendable and adjustable to accommodate different types of objects during use, to direct air onto the areas behind or in front of the first row seats, and to allow for easy storage during periods of non-use in an out of sight and out of the way manner. Variable air flow control may also be provided to accommodate the different functions performed by the auxiliary ducting.

SUMMARY OF THE INVENTION

In accordance with the purposes and benefits described herein, a vehicle having an auxiliary duct is provided. The vehicle may be broadly described as including a front row of seats including a driver seat and a passenger seat, a second row of seats, a console positioned between the driver seat and the passenger seat, the console having at least one vent, ducting for directing air from the heating system to the at least one vent and into the passenger compartment, and an auxiliary duct pivotally attached to the console and in fluid communication with the ducting.

In another possible embodiment, the auxiliary duct extends rearward of the front row of seats in a first position and forward between the console and one of the driver seat and the passenger seat in a second position.

In accordance with one other possible embodiment, the vehicle further includes a second auxiliary duct pivotally attached to the console and in fluid communication with the ducting, wherein the auxiliary duct is attached to the console adjacent the driver seat and the second auxiliary duct is attached to the console adjacent the passenger seat.

In yet another possible embodiment, the auxiliary duct includes a first portion attached to the console and a second portion telescopically supported by the first portion. In another, the second portion of the auxiliary duct includes a vent at a distal directing air toward a side of the vehicle.

In still another possible embodiment, the vehicle further includes a diverter for selectively diverting air from the ducting through the auxiliary duct. In yet another, the vehicle further includes a lever for moving the diverter and controlling a volume of air diverted through said auxiliary duct.

In one additional possible embodiment, a vehicle having a heating system for controlling a temperature of a passenger compartment includes a front row of seats including a driver seat and a passenger seat, a second row of seats, a console positioned between the driver seat and the passenger seat, an auxiliary duct having first and second telescoping portions, the first telescoping portion pivotally attached to the console at a proximal end and the second telescoping portion having a vent at a distal end, and ducting for directing air from the heating system into the auxiliary duct.

In another possible embodiment, the auxiliary duct extends forward in a first position. In yet another, the auxiliary duct extends rearward in a second position.

In still yet another possible embodiment, the vehicle further includes a stop for limiting a range of pivot between the first position and the second position such that the auxiliary duct can support an object positioned on the distal end of the second telescoping portion in a third position.

In one other possible embodiment, the range of pivot is limited such that the auxiliary duct extends rearward and upward in the third position.

In still another possible embodiment, the range of pivot extends from the first position wherein the distal end of the second telescoping portion is in contact with a floor of the vehicle to the second position wherein the distal end of the second telescoping portion is in contact with the floor.

In another possible embodiment, the vehicle further includes a diverter for selectively diverting air from the ducting through the auxiliary duct. In another, the vehicle further includes a lever for moving the diverter and controlling a volume of air diverted from the ducting and through the auxiliary duct.

In still one other possible embodiment, a vehicle having an air distribution system for moving air into a passenger compartment includes a front row of seats including a driver seat and a passenger seat, a second row of seats, a console positioned between the driver seat and the passenger seat, the console having first and second rearward facing vents, ducting for directing air from the air distribution system through at least the first and second vents and into a rear portion of the passenger compartment, and a first auxiliary vent having first and second telescoping portions, the first telescoping portion pivotally attached to the console at a proximal end and in fluid communication with the ducting, and the second telescoping portion including a vent positioned at a distal end.

In another possible embodiment, the first auxiliary vent is positioned for pivotal movement within a plane defined by the console and the driver seat.

In yet another possible embodiment, the vehicle further includes a second auxiliary vent having first and second telescoping portions, the first telescoping portion pivotally attached to the console at a proximal end and in fluid communication with the ducting, and the second telescoping portion including a vent positioned at a distal end, and wherein the second auxiliary vent is positioned for pivotal movement within a plane defined by the console and the passenger seat.

In still another possible embodiment, the vehicle further includes a stop for engaging the first auxiliary duct and limiting a range of pivot between a stowed position substantially between the console and one of the driver seat and the passenger seat, and an active position wherein the first auxiliary duct supports an object at the distal end.

In another, the range of pivot is limited such that the first auxiliary duct extends rearward and upward in the active position.

In the following description, there are shown and described several embodiments of a vehicle having an auxiliary duct pivotally attached to a console. As it should be realized, the invention is capable of other, different embodiments and its several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle having an auxiliary duct pivotally attached to a console and together with the description serve to explain certain principles thereof. In the drawing figures:

FIG. 3 is a partial rear plan view of a front row of seats and center console; and FIG. 4 is a partial side plan view of an auxiliary duct pivotally attached to a center console.

Reference will now be made in detail to the present preferred embodiments of the vehicle having an auxiliary duct pivotally attached to a console, examples of which are illustrated in the accompanying drawing figures, wherein like numerals are used to represent like elements.

DETAILED DESCRIPTION

Figure 1:
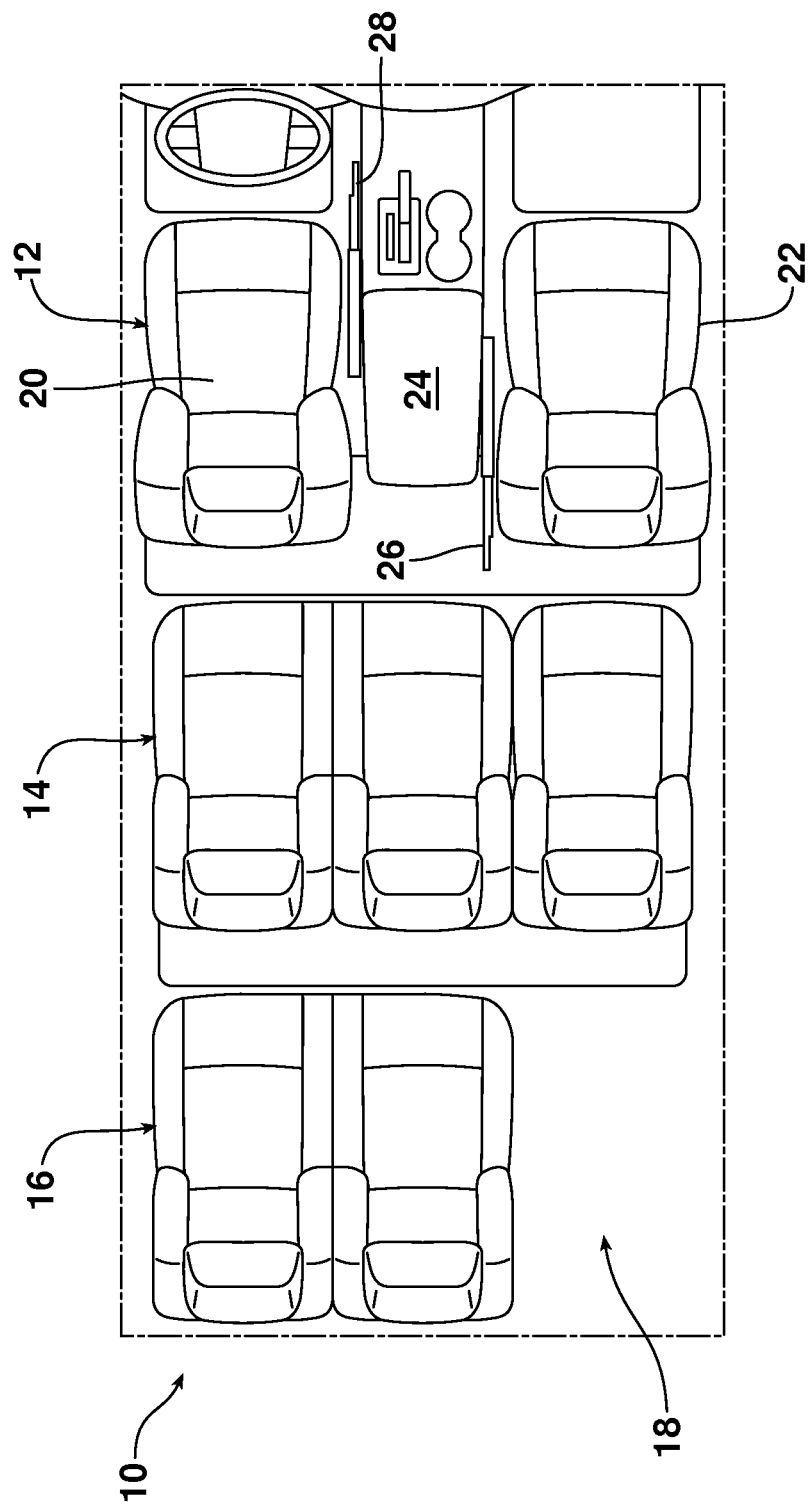
FIG. 1 is a top plan view of a typical vehicle having a front row of seats, a second row of seats, and a third row of seats in a passenger compartment.

Reference is now made to FIG. 1 which illustrates a vehicle 10 having a front row of seats 12, a second row of seats 14, and a third row of seats 16 in a passenger compartment 18. The front row of seats 12 includes a driver seat 20 and a passenger seat 22. A center console 24 is positioned between the driver seat 20 and the passenger seat 22.

Figure 2:
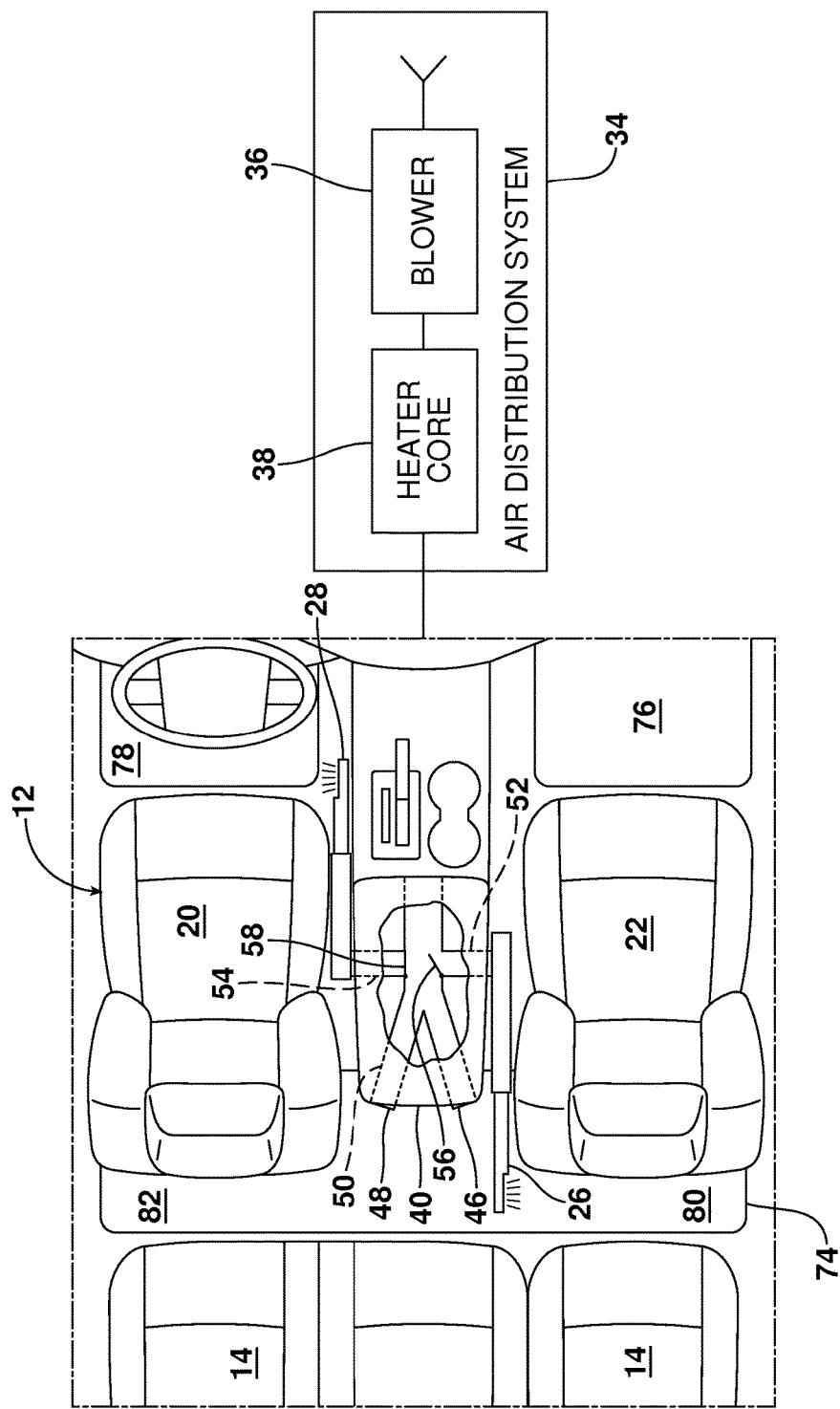
FIG. 2 is a partial top plan view and schematic of the typical vehicle showing the front row of seats and the second row of seats in the passenger compartment.

As shown in FIG. 2, first and second auxiliary ducts 26, 28 are pivotally attached to sides of the center console 24. More specifically, the first auxiliary duct 26 is attached to a side 30 of the console adjacent the passenger seat 22 and the second auxiliary duct 28 is attached to a side 32 of the console adjacent the driver seat 20. Although two auxiliary ducts are shown in the described embodiment, the vehicle 10 may be limited to one auxiliary duct or could include three or more auxiliary ducts.

As further schematically shown in FIG. 2, an air distribution system 34 is provided. In the described embodiment, the air distribution system 34 includes a heating system having a blower 36 and a heater core 38 for warming ambient or recirculated air for distribution through the ducting and into the passenger compartment 18 as is known in the art. Of course, any type of air distribution system may be utilized including, for example, a heating system and/or a cooling system, or even a fan.

As shown in FIG. 3, a rearward facing surface 40 of the center console 24 includes first and second vents 42, 44. First and second louvres 46, 48 attached to the rearward facing surface 40 direct air moving through the first and second vents 42, 44 into the passenger compartment 18. As is known in the art, the louvres can be opened and closed and/or pivotally moved from left to right and vice-versa to control both a direction and an amount of air flowing into the passenger compartment.

Returning to FIG. 2, ducting 50 (partially shown in dashed line) directs air from the air distribution system 34 through the center console 24 (shown partially cut-away) and out the first and second vents 42, 44 into the passenger compartment 18. Although the ducting 50 is depicted extending through a central portion of the center console, the ducting may be routed through, around, or even beneath, the center console 24 depending upon the design thereof. Branches 52, 54 of the ducting extend toward and are in fluid communication with the first and second auxiliary ducts 26, 28.

First and second doors 56, 58 are positioned adjacent the ducting 50 where the branches 52, 54 attach to the ducting for selectively diverting air from the ducting through one or both of the first and second doors, and the first and second auxiliary ducts 26, 28. Door 56 is shown in a partially extended, or open, position. In this position, door 56 diverts a portion of the air from the ducting 50 into the first auxiliary duct 26. Second door 58 is shown in a closed position preventing air from flowing through the second auxiliary duct 28.

As best shown in FIG. 3, first and second levers 60, 62 are positioned beneath the first and second vents 42, 44 on the rear surface 40 of the center console 24 in the described embodiment. The sliding levers 60, 62 are utilized to control movement of their respective doors 56, 58 and a volume air diverted through their respective auxiliary ducts 26, 28. Alternate embodiments may include controls, including similar levers or electronic control, utilized by passengers seated in the front row seats and/or steering wheel controls may be utilized as well.

As shown in FIG. 4, the first auxiliary duct 26 is attached to the passenger side 30 of the center console 24 for pivotal movement (shown by action arrow A) throughout a range of pivot. As shown, the range of pivot extends from a first position, shown in dashed line and designated by reference numeral 66, to a second position, shown in dashed line and designated by reference numeral 68. Even more, the pivotal movement of the first auxiliary duct 26 is within a plane (shown as X and Y coordinates) generally defined by the center console 24 and the passenger seat 22.

The first auxiliary duct 26 is shown in solid line in a third position designated reference numeral 70. In the third or active position 70, the auxiliary duct 26 extends rearward and upward. Although the auxiliary duct 26 is shown in the third position at an angle of about minus one-hundred twenty degrees from the X-axis, the third position can be anywhere from minus ninety degrees, i.e., vertical, through minus one-hundred eighty degrees depending on the object intended to be supported by the auxiliary duct. These limits are intended to allow space for an object 72 to be positioned over the auxiliary duct 26 as shown. In instances, where the auxiliary duct 26 is utilized for drying and/or warming floor areas, as described below, the range of pivot may be greater and is limited only by contact of the auxiliary duct 26 with the vehicle floor, carpet, or floor mat.

In the third position 70, the first auxiliary duct 26 supports an object 72 (e.g., a wet snow boot as shown in dashed line) in position over a rear floor mat 74 in the described embodiment. In this position, the object 72 is both out of the way of the vehicle operator in the front row seats 12 and if the object is dripping wet, the dripping water/snow will be collected on the rear floor mat 74. Warm air is diverted through the first auxiliary duct 26 for drying and/or warming the object.

Even more, when positioned in the first position 66, the first auxiliary duct 26 is adjacent a front floor mat 76 and can be utilized to dry the front floor mat and/or warm the passenger's lower extremities. More specifically, the first auxiliary duct 26 is adjacent a passenger side front floor mat 76. Similarly, when the second auxiliary duct 28 is positioned in the first position, air is directed onto a driver side front floor mat 78 as shown in FIG. 2. If the vehicle does not include front floor mats, then the first and second auxiliary ducts 26, 28 can be utilized in this manner to dry the front floor area whether the front floor area is covered with carpet, carpeted floor mats, or has no covering at all. In the first position 66, just like the third position 70, warm air may be diverted through one or both of the auxiliary ducts 26, 28 and directed out of the respective vent onto the surfaces to be dried.

Similarly, when positioned in the second position 68, the first auxiliary duct 26 is adjacent the rear floor mat 74 and can be utilized to dry the rear floor mat. More specifically, the first auxiliary duct 26 is adjacent a passenger side rear floor mat or passenger side portion 80 of a combined rear floor mat 74. Similarly, when the second auxiliary duct 28 is positioned in the second position 68, air is directed onto a driver side rear floor mat or driver side portion 82 of a combined rear floor mat 74. If the vehicle 10 does not include rear floor mats, then the first and second auxiliary ducts 26, 28 can be utilized to dry the rear floor area whether rear floor area is covered with carpet, carpeted floor mats, or has no covering at all. In the second position 68, just like the third position 70, warm air may be diverted through one or both of the auxiliary ducts 26, 28 and directed out of the respective vent onto the surfaces to be dried.

As further shown in FIG. 4, the first auxiliary duct 26 includes first and second telescoping portions 84, 86 and is extendable lengthwise (as shown by action arrow B) in the described embodiment. The first telescoping portion 84 is attached to the passenger side 30 of the center console 24 at a proximal end 88 and is in fluid communication with the ducting 50 as described above. The second telescoping portion 86 extends from and is partially nested within the first telescoping portion 84. The second telescoping portion 86 includes a vent 90 positioned at a distal end 92 thereof. In the described embodiment, the vent 90 in the second telescoping portion 86 opens toward a passenger side of the vehicle 10. In other words, the vent 90 directs air flowing through the auxiliary duct 26 toward an exterior or side of the vehicle and away from the second auxiliary duct 28. The second auxiliary duct 28 is similarly mounted and likewise includes first and second telescoping portions. A vent in the second auxiliary duct 28 also directs air away from the first auxiliary duct 26 and toward the driver side of the vehicle.

In the first position 66, the first auxiliary duct 26 is shown in a fully extended position and directed toward a front of the vehicle. As shown, the second portion 86 of the first auxiliary duct 26 is extended from the first portion 84 and the vent 90 opens toward the passenger side of the vehicle. In this position, the distal end 92 of the first auxiliary duct 26 is positioned adjacent (or contacting) the passenger side front floor mat 76 and may be utilized to dry the passenger side front floor mat or to warm the feet and leg area in front of the passenger seat 22. In this position, the floor mat 76 or carpet essentially limits the range of pivot in the forward direction. In other words, the first auxiliary duct is pivoted such that the vent directs warm air onto the front floor mat 76 or into the area directly above the floor mat.

In the second position 68, the first auxiliary duct 26 is shown in a partially retracted position and directed toward a rear of the vehicle. As shown, the second portion 86 of the first auxiliary duct 26 is only partially extended from the first portion 84 and the vent 90 opens toward the passenger side of the vehicle. In this position, the distal end 92 of the first auxiliary duct 26 is positioned adjacent the passenger side portion 80 of the rear floor mat 74. In this position, the first auxiliary duct 26 may be utilized to dry the passenger side portion 80 of the rear floor mat 74 or to warm the feet and leg area in front of the passenger side of the second row seat 14. In this position, the floor mat 74 or carpet essentially limits the range of pivot in the rearward direction. In other words, the first auxiliary duct 26 is pivoted such that the vent 90 directs warm air onto the passenger side portion 80 of the rear floor mat 74 or into the area directly above the floor mat.

Although the first auxiliary duct 26 is illustrated and described in FIG. 4, the second auxiliary duct 28 is a mirror image of the first auxiliary duct. Accordingly, the above-description applies to the second auxiliary duct 28 except the duct of the second auxiliary duct directs air toward the driver side of the vehicle.

In summary, numerous benefits result from the utilization of the first and second auxiliary ducts 26, 28 pivotally attached to the center console 24 of a vehicle 10 as illustrated in this document. The auxiliary ducts allow for warming and drying of objects such as gloves, hats, shoes, and/or boots, and for drying floor areas behind and/or in front of the first row seats. Even more, the auxiliary ducts may support the objects within the area between the first and second seat rows during drying and may be extendable and adjustable to accommodate different types of objects and to allow for easy storage during periods of non-use in an out of sight and out of the way manner.

The foregoing has been presented for purposes of illustration and description. It is not intended to be exhaustive or to limit the embodiments to the precise form disclosed. Obvious modifications and variations are possible in light of the above teachings. For example, the vehicle may include only first and second seat rows. Even more, the vehicle could be an automobile, a minivan, a sports utility vehicle, or a crossover vehicle. All such modifications and variations are within the scope of the appended claims when interpreted in accordance with the breadth to which they are fairly, legally and equitably entitled.

What is claimed:

1. A vehicle having a heating system for controlling a temperature of a passenger compartment, comprising:
   a front row of seats including a driver seat and a passenger seat;
   a second row of seats;
   a console positioned between said driver seat and said passenger seat;
   an auxiliary duct having first and second telescoping portions, said first telescoping portion pivotally attached to said console at a proximal end and said second telescoping portion having a vent at a distal end; and
   ducting for directing air from the heating system into said auxiliary duct, wherein (a) said first and second telescoping portions move within a plane defined by said console and one of said driver seat and said passenger seat, (b) said auxiliary duct extends forward in a first position, (c) said auxiliary duct extends rearward in a second position and (d) a range of pivot extends from the first position wherein said distal end of said second telescoping portion is adjacent to a floor of said vehicle to the second position wherein said distal end of said second telescoping portion is adjacent said floor.

2. The vehicle of claim 1, further comprising a stop for limiting a range of pivot between the first position and the second position such that said auxiliary duct can support an object positioned on said distal end of said second telescoping portion in a third position.

3. The vehicle of claim 2, wherein said range of pivot is limited such that said auxiliary duct extends rearward and upward in the third position.

4. The vehicle of claim 3, further comprising a diverter for selectively diverting the air from the heating system from said ducting through said auxiliary duct.

5. The vehicle of claim 4, further comprising a lever for moving said diverter and controlling a volume of the air from the heating system diverted from said ducting and through said auxiliary duct.

6. The vehicle of claim 1 wherein said console includes first and second rearward facing vents.

7. The vehicle of claim 6 wherein said ducting also directs the air into said first and second rearward facing vents.

\* \* \* \* \*